E. Young,
Harvester Dropper

No. 69529 . Patented. Oct. 1. 1867.

Witnesses:
J.W. Randolph
Chas. H. Royle

Inventor:
E. Young
By his Atty,
M. Randolph & Co.

United States Patent Office.

ELIJAH YOUNG, OF FAYETTEVILLE, MISSOURI.

*Letters Patent No. 69,529, dated October 1, 1867.*

IMPROVEMENT IN HARVESTERS.

*The Schedule referred to in these Letters Patent and making part of the same.*

---

TO ALL WHOM IT MAY CONCERN:

Be it known that I, ELIJAH YOUNG, of Fayetteville, in the county of Johnson, and State of Missouri, have invented a new "Sheaf-Dropping Attachment for Harvesters;" and I do hereby declare that the following is a full and clear description thereof, reference being had to the accompanying drawings, and to the letters of reference marked thereon.

This invention consists in attaching to the framework of any reaping machine a rotating reel or series of aprons radiating from a central shaft which is located directly behind the reel that presses the heads of the standing grain down toward the cutters. As each of the aprons of the aforesaid reel receives sufficient grain to form one sheaf, the driver who is operating the machine will press with one of his feet upon a spring that will disengage a certain spring-pawl that until that moment will hold the said reel from turning, and so accumulate a sheaf.

To enable those skilled in the art to make and use my improved sheaf-attachment, I will proceed to describe its construction and operation.

Figure 1:
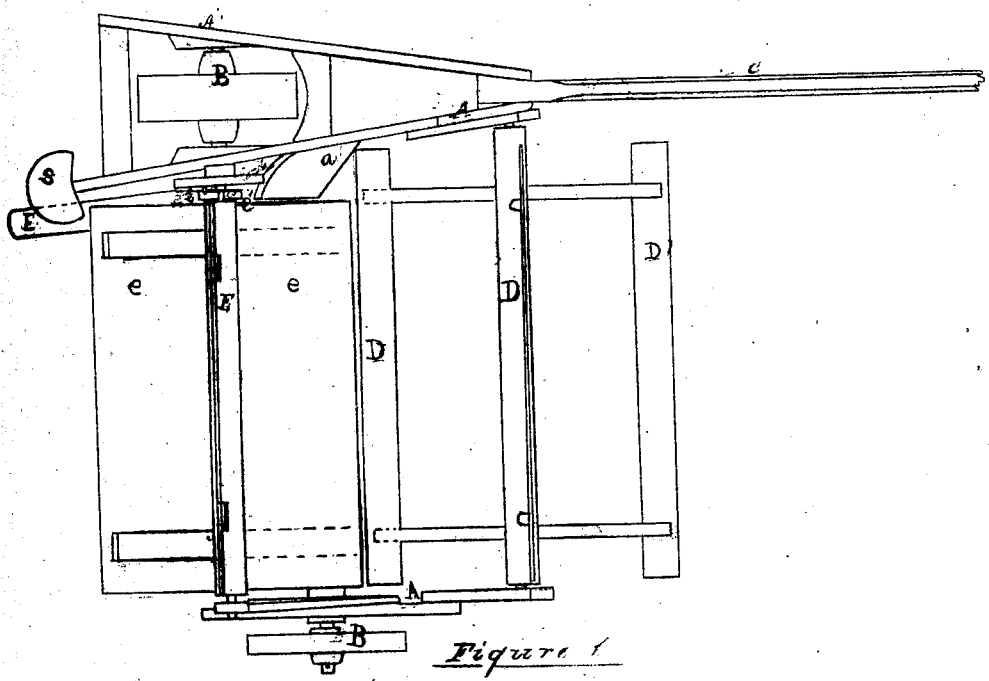

Figure 1 of the drawings, is a plan of a harvester provided with one of the improved sheaf-attachments.

Figure 2:
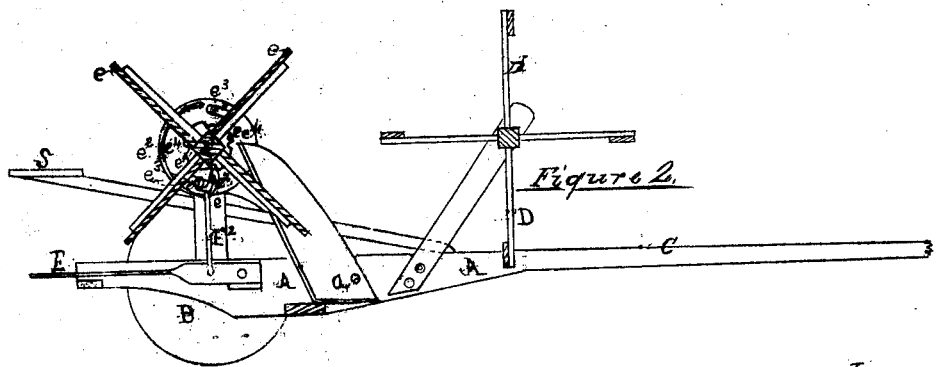

Figure 2 is a sectional elevation of a similar machine.

A represents the framework of the machine, B the wheels on which it is mounted, and C the pole by which it is drawn. D is the reel that is used in advance of the cutters $a$, to press the heads of the standing grain down toward them. These parts are all so precisely similar to those machines that are now in use that no particular description need be given of them. Directly behind the reel D there is located a shaft, E, which has its bearings in some portion of the frame A. Radiating from this shaft there are four or more aprons, $e$, which form, with the shaft E, a rotating reel. On one end of the shaft E there is a toothed ratchet, $e^1$, into the teeth of which a spring-pawl, $e^2$, takes hold. This pawl is fastened to an adjustable disk, $e^4$, secured to some portion of the frame A by means of the screws $e^3$. These screws pass through slots in the said disk, and permit an adjustment of it by turning it forward or backward.

As the driver sits upon his seat S, he can place one of his feet upon the treadle $E^1$. The said treadle being connected with the spring-pawl by means of the link $E^2$, will by such pressure of the driver's foot release the pawl from its ratchet and permit the reel E $e$ to turn over sufficiently to drop one sheaf. The sheaves will be formed on the upper side of the lower forward apron $e$ by the accumulation of the cut grain as it comes from the cutters and is thrown back by the reel D. Every time the driver releases the pawl $e^2$, he should be careful to let it slip back quickly, so as to catch on the next tooth of the ratchet. As the dropping of the sheaves is wholly under the control of the driver, and not actuated by any arbitrary machinery, it follows that the size of the sheaves may be rendered uniform, whether the crop cut be a light or a heavy one. The journals of the shaft E should be fitted into adjustable bearings in the frame A, so that it might be raised up or lowered down as desired. The aprons $e$ may be formed of wide thin boards or other material, secured to arms radiating from the shaft E, or they may be formed of lattice-work, secured to those arms.

Having described my invention, what I claim, is—

The adjustable disk $e^4$, in combination with the spring-pawl and the ratchet, substantially as described and set forth.

ELIJAH YOUNG.

Witnesses:
   M. RANDOLPH,
   CHAS. H. BOYLE.